United States Patent [19]

Romney et al.

[11] Patent Number: 5,592,143
[45] Date of Patent: Jan. 7, 1997

[54] PULSED-TONE TIMING EXERCISE METHOD

[76] Inventors: Julie B. Romney, 2970 Devonshire Cir., Salt Lake City, Utah 84108; William R. Bushman, 859 E. 1050 South, Spanish Fork, Utah 84660

[21] Appl. No.: 279,440

[22] Filed: Jul. 25, 1994

[51] Int. Cl.⁶ .............................. G08B 1/00; G09B 17/04
[52] U.S. Cl. .................. 340/309.15; 340/323 R; 340/384.7; 340/384.71; 84/470 R; 84/636; 434/178; 434/179
[58] Field of Search .......................... 340/309.15, 323 R, 340/384.7, 384.71, 384.5, 384.4, 384.3; 84/470 R, 484, 479 R, 636; 434/178, 179

[56] References Cited

U.S. PATENT DOCUMENTS

| | | | |
|---|---|---|---|
| 2,110,344 | 3/1938 | Taylor et al. | |
| 3,332,076 | 7/1967 | Burson | 340/384 |
| 3,594,919 | 7/1971 | Debell et al. | |
| 3,982,332 | 9/1972 | Szymczak | 40/352 |
| 4,014,167 | 3/1977 | Hasegawa et al. | 340/384.71 |
| 4,189,852 | 2/1980 | Chatlien | |
| 4,315,502 | 2/1982 | Gorges | 128/1 C |
| 4,583,443 | 4/1986 | Senghaas et al. | 84/484 |
| 4,655,112 | 4/1987 | Mitarai | 84/1.03 |
| 4,733,593 | 3/1988 | Rothbart | 84/484 |
| 4,775,322 | 10/1988 | Behunin | 434/179 |
| 5,033,966 | 7/1991 | Behunin | 434/179 |
| 5,124,228 | 5/1993 | Hoiles et al. | 84/470 R |

OTHER PUBLICATIONS

The Evelyn Wood Seven Day Speed Reading and Learning Program, Stanley D. Frank E.D.D., Avon Books (pp. 158–163) Jan. 1990.

*Primary Examiner*—Donnie L. Crosland
*Attorney, Agent, or Firm*—Thorpe, North & Western

[57] ABSTRACT

A pulsed-tone timing method. Pulsed audible guide tones are activated at an initial pulsing rate. The pulsing rate is manipulated so as to repeatable (i) increase the pulsing rate over a time span to an intermediate pulsing rate and (ii) abruptly drop the pulsing rate to a decreased rate between the intermediate pulsing rate and a previous rate, until a predetermined final pulsing rate is reached. The pulsing rate can be manipulated such that each subsequent intermediate pulsing rate pulses at a faster rate than previous intermediate pulsing rates. The method can be used in many activities. For example, a reader can read a line of text per each guide tone while keeping pace with the specifically timed rate increases, thereby increasing reading effort and reading speed.

18 Claims, 5 Drawing Sheets

RATES AT EACH WAVE POINT FOR ALL 5
SELECTIONS AVAILABLE ON A RAMPING PUSH-UP

| BASE RATE 20 | SELECTIONS | | | | |
|---|---|---|---|---|---|
| | 100% | 80% | 60% | 40% | 20% |
| END #1 | 30 | 28 | 26 | 24 | 22 |
| START #2 | 25 | 24 | 23 | 22 | 21 |
| END #2 | 35 | 32 | 29 | 26 | 23 |
| START #3 | 30 | 28 | 26 | 24 | 22 |
| END #3 | 40 | 36 | 32 | 28 | 24 |

*Fig. 4A*

WAVE POINTS

| BASE RATE 40 | SELECTIONS | | | | |
|---|---|---|---|---|---|
| | 100% | 80% | 60% | 40% | 20% |
| END #1 | 60 | 56 | 52 | 48 | 44 |
| START #2 | 50 | 48 | 46 | 44 | 42 |
| END #2 | 70 | 64 | 58 | 52 | 46 |
| START #3 | 60 | 56 | 52 | 48 | 44 |
| END #3 | 80 | 72 | 64 | 56 | 48 |

*Fig. 4B*

WAVE POINTS

PULSED-TONE TIMING EXERCISE METHOD

BACKGROUND OF THE INVENTION

1. The Field of the Invention

The present invention relates generally to the field of pacing methods such as metronome-enhanced rhythmic pacing. More particularly, it concerns a reading exercise method for increasing a reader's reading rate.

2. The Background Art

It is known in the art to produce rhythmic sound sequences to assist in pacing certain activities such as music, speaking and reading. For example, metronomes are used to provide a rhythmic beat which can be increased and decreased. Users desiring to increase the tempo of their musical exercises, speaking rate or reading speed may gradually increase the rhythmic beat of the metronome and increase the rate of their activity correspondingly.

A conventional way of exercising one's reading speed is to simply read text at a pace set by a metronome-type device. Speed readers often practice by reading one line of text for each beat cycle of the metronome. As the beat frequency of the metronome is increased, the user is compelled to read the lines of text at a faster rate in order to keep pace with the beat cycles.

Some of the early attempts to improve the state of the art in the field of timing and pacing have focused on the device and not the method. U.S. Pat. No. 3,332,076 (issued to Burson, Jr. on Jul. 18, 1967) discloses a portable transistorized oscillator unit for producing audible impulses or clicks at adjustable rates. However, the method of use was essentially the same: simply increase the beat frequency to increase the reading rate.

More recent attempts to improve the state of the art are touted as novel methods, but are essentially new devices for performing the same old method. For example, U.S. Pat. Nos. 4,775,322 and 5,033,966 (issued to Behunin on Oct. 4, 1988 and Jul. 23, 1991, respectively) disclose sound systems for producing cyclic stereophonic sound patterns in the form of panning sound sequences. A sound source is panned stereophonically from left to right then right to left to pace a reader's eye movement accordingly. Volume adjustment is used to enhance the panning effect, for example by increasing the volume as the sound is panned stereophonically from left to right. The Behunin patents teach additional effects such as pitch adjustment and stenopaic goggles used to block visual distractions to the reader's line of sight.

Some attempts have been made to improve the actual method of use of the sound patterns. For example, "ramp" and "push-up" functions have been used to help increase effort on the part of the reader. The ramp method involves increasing the frequency of an audible beat cycle over a period of time, such as a three to five minute period, from an initial rate to a new increased rate. The reader keeps pace with the increasing beat cycle to achieve the new rate. The push-up method essentially involves performance of the ramp method a number of consecutive times. For example, instead of a one-time increase from an initial rate to a new increased rate, the frequency is abruptly dropped back down to the initial rate and again uniformly increased to the new increased rate. This is done two or more times in order to gradually condition the reader for performance at the increased rate. However, it can be seen by those familiar with the field that the ramp and push-up methods are mere reformulations of the old method: a mere uniform increase of the beat frequency to increase the reading rate.

Inspection of the prior art thus reveals that many of the improvements involve either elaborate devices which fail to significantly induce increased effort by the reader, or mere reformulations of the old methods. It is in fact a common thread in many areas of endeavor in modern society that people tend to pursue additional gadgetry instead of additional effort when attempting to improve performance. Applicant has discovered that reading rates can be improved without fancy goggles or stereophonic sound shows, if readers are simply induced to increase their effort. Of current interest are methods and devices which provide improved ways to increase effort and speed in activities such as reading, musical exercises and the like.

OBJECTS AND SUMMARY OF THE INVENTION

It is therefore an object of the present invention to provide a device and corresponding method for producing novel pacing sequences useful to improve rates of performance in various activities.

It is another object of the invention to provide such a method which is particularly adapted to assist in the improvement of reading rates.

The above objects and others not specifically recited are realized in a specific illustrative example of a pulsed-tone timing method. Pulsed audible guide tones are activated at an initial pulsing rate. The pulsing rate is manipulated so as to repeatably (i) increase the pulsing rate over a time span to an intermediate pulsing rate and (ii) abruptly drop the pulsing rate to a decreased rate between the intermediate pulsing rate and a previous rate, until a predetermined final pulsing rate is reached. The pulsing rate can be manipulated such that each subsequent intermediate pulsing rate pulses at a faster rate than previous intermediate pulsing rates. The method can be used in many activities. For example, a reader can read a line of text per each guide tone while keeping pace with the specifically timed rate increases, thereby increasing reading effort and reading speed.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 4A illustrates a matrix table of pulsing rates obtained in the ramping push-up exercise of FIG. 3, for an initial base rate of 20 cycles per minute;

FIG. 4B illustrates a matrix table of pulsing rates obtained in the ramping push-up exercise of FIG. 3, for an initial base rate of 40 cycles per minute;

DETAILED DESCRIPTION OF PRESENTLY PREFERRED EMBODIMENTS

Figure 1:
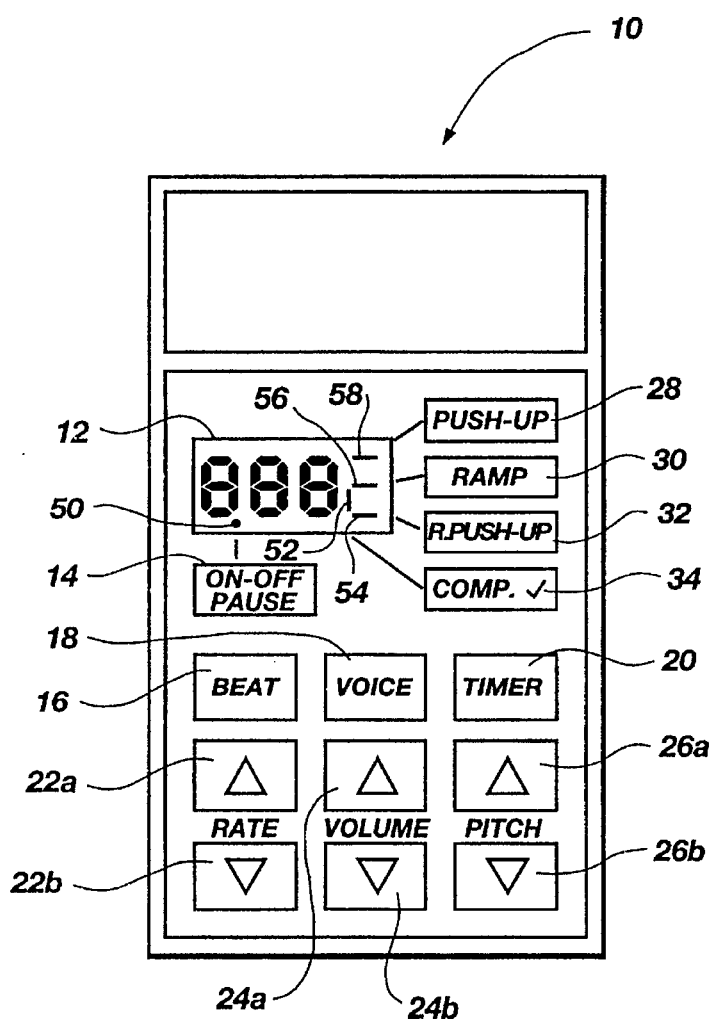
FIG. 1 illustrates a front view of an electronic pulsed-tone producing device made in accordance with the principles of the present invention.

Referring now to FIG. 1, there is shown an electronic auditory pacing device generally designated at 10. The device 10 includes a digital display window 12 and various switch keys. The switch keys include the following: an on-off-pause key 14; a beat selection key 16; a voice selection key 18; a timer key 20; rate increase and decrease keys 22a and 22b, respectively; volume increase and decrease keys 24a and 24b, respectively; pitch increase and decrease keys 26a and 26b, respectively; a push-up exercise key 28; a ramp exercise key 30; a ramping push-up exercise key 32; and a comprehension check key 34. The device 10 includes a speaker 40 (shown in FIG. 2 in phantom line). The device 10 also includes a circuitboard (not shown) as known in the art to electronically intercouple the speaker 40, display window 12 and each of the keys identified above, such that depression of a key activates a desired function. Batteries (not shown) are a preferred power source so as to render portable the device 10.

The device 10 is an auditory pacing device used to pace the tracking of a reader's hand as the reader scans lines of text. The device 10 generates and emits a monophonic tone or series of tones, through the on-board speaker 40 or through a headset (not shown), designed to prompt the reader to read in synchronization with the tone a segment of text, such as one line of text per tone or one line of text per series of tones. The tones may comprise beeping or clicking sounds or any other suitable sounds. The cycles per minute (CPM) of the tone or series of tones can be varied from a rate of 10 CPM to 170 CPM. The reader allows his or her eyes to follow the speed and direction of the tracking of the hand or finger, viewing the words as they scan.

The basic operation of the device 10 is substantially intuitive. When the on-off-pause key 14 is pressed, the device 10 begins emitting pulsed beats according to whatever sequence was being generated when it was last turned off. The number of beats per cycle can be adjusted by pressing the beat selection key 16. The voice of the beats can be changed from clicks to tones by pressing the voice selection key 18. The time length of the beat sequence can be adjusted by pressing the timer key 20. The rate, volume and pitch of the beats can be increased and decreased by manipulation of the rate keys 22a and 22b, volume keys 24a and 24b, and pitch keys 26a and 26b, respectively.

The device 10 is programmed as known in the art to permit operate of the feature keys, adjustment keys and function keys in accordance with the following preferred functional characteristics. It is to be understood that variations of the specific operation of each key remain within the scope of the present invention.

FEATURE KEYS

ON-OFF-PAUSE KEY 14: Pressing the on-off-pause key 14 once turns on the device 10. The rate of the beat cycle will appear in the display window 12 (which is preferably an LCD window) and the tone begins to sound in the speaker 40, at level rate, the cycles per minute (CPM) that was being generated when it was last turned off. The rate of 30 CPM is generated the first time the batteries are installed. Pressing the on-off-pause key 14 a second time puts the device 10 in Pause mode. Whenever the device 10 is in Pause mode a Pause icon 50 flashes, the rate continues to be displayed in the display window 12 and the tone is not sounded in the speaker 40. This holds true even during the automatic pauses as part of the sequencing within the functions of the device 10. When the device 10 is on, pressing the on-off-pause key 14 twice in succession within two seconds turns off the device. The display window 12 displays the word "OFF" then goes blank and the tone is not sounded in the Off mode.

BEAT SELECTION KEY 16: With each press of the beat key 16, the display window 12 displays a number indicating the next choice in a sequence of 6 selections. The selections and order of selection are b-0, b-1, b-2, b-3, b-4, b-5, b-6 and b-7. Each selection indicates a number of weak beats which are sounded before an accent or strong beat per cycle, with the exception of selection numbers b-6 and b-7. A selection of b-0 would sound only the strong beat, one per cycle, without a weak beat preceding it. The strong and weak beats can be distinguished in any suitable manner. For example, the strong beat can be accentuated with a louder volume or a higher pitch than the weaker beats. The strong beat thus performs a guide function and shall be referred to herein as a guide tone. The term "guide tone" as used herein shall be interpreted broadly to include any suitably accentuated sound, such as clicks, beeps, and the like.

When b-6 is selected a continuous tone is sounded for about three-fourths of the cycle followed by two beats for the remaining one-fourth of the cycle. When b-7 is selected a continuous tone is sounded for about one half of the cycle followed by four beats for the remaining half of the cycle. The lengths of the tones of selections b-6 and b-7 are determined by the CPM rate selected (as discussed below) so that the tone and the following beats con be contained within the time allowed. In selections b-0 through b-5, the beats are evenly spaced within the cycle, regardless of the length of the cycle.

The selections b-6 and b-7 are useful when using the device 10 for speed reading exercises. For example, the user can read one line of text per each continuous tone, and shift his or her line of sight from right to left to a following line of text while the shorter beats are emitted. This method of pacing can take many equivalent forms, such as activating only one pulsed tone following each continuous tone, or activating a series of pulsed tones following the continuous tone. The continuous tone and the following pulsed tone or tones can be emitted within equivalent or non-equivalent time intervals. The collective lengths of the pulsed tones, when present, may be the same as or different than the length of the continuous tone.

The number indicating the beat selection continues to be displayed in the display window 12 for about three seconds after the last time the beat key 16 was pressed. At this point the display shown in the window 12 toggles back to display the rate and the selection is initiated and begins to sound the tone or sequence of tones in the headset the moment the key is released each time. After the rate is again displayed pressing the beat key 16 would begin the beat selection sequence starting at the next one in the sequence being displayed and sounded. The beat selection is remembered and applied to each new rate, voice or any other change selected even when the device 10 is paused or turned off.

The beat key 16 must be pressed again to initiate another beat selection.

VOICE SELECTION KEY 18: Different types or sounds of tones can be made available on a rotation basis. Preferably, each time the voice key 18 is pressed the number v-1, v-2, or v-3, whichever one corresponds to that selection, is displayed in the display window 12 and the voice corresponding to that number begins to sound instantly after the last time the voice key 18 was pressed. Adjusting the voice does not interfere or interrupt whatever mode the device is currently in. The number corresponding to that voice remains lit for two seconds after the last time the voice key 18 was pressed, then toggles back to the rate display. At present, the words best describing the three voice selections v-1, v-2 and v-3 are BEEP, CLICK and WHOOSH, respectively.

TIMER KEY 20: To activate a timing function the timer key 20 must be pressed. The time desired is determined by the number of times the key is pressed in succession: one depression for each minute of time desired from one minute to five minutes, in one minute increments, then, each depression advances the timer in five minute increments from ten to thirty minutes. It then advances in 15 minute increments to 45 and 60 minutes. The new number indicating the amount of time selected appears in the display window 12 each time the timer key 20 is pressed.

For example: if a five minute running time is desired before pausing, the timer key 20 must be pressed five times in succession. If a ten minute countdown is desired, six key depressions must be made, and so on: seven depressions for fifteen minutes, eight for twenty minutes, nine for twenty five minutes, ten for thirty minutes, eleven for forty five minutes and twelve for sixty minutes. If the number "60" is displayed in the display window 12 an additional key depression would rotate the display back to 1 minute to begin the sequence again. The period of time between each successive key depression cannot exceed two seconds.

The tone remains silent during the time the selection is being made and the display window 12 displays the number corresponding to the selection made for three seconds following the last moment the timer key 20 was depressed. At this point the display shown in the display window 12 toggles back to the rate display and the tone begins to sound. The tone will continue to sound until the time selected is expired. At this point the device goes to Pause mode, with the Pause icon 50 flashing, until another selection is made. Activating the timer in no way affects the features, such as Rate, Volume, Pitch, Beat and Voice, the device is currently in.

In order to avoid interference with the timing or sequencing of a particular function, the timer cannot be selected when a function icon 52, 54, 56 or 58 is displayed. However, a function (described below) can be selected even when the timer has been activated and is counting down. In this case the timer is deactivated and the function that was selected takes precedent. To view time remaining whenever the timer is active, the timer key 20 is pressed one time. The display window 12 shows the time remaining for two seconds then toggles back to display rate. To deactivate the timer press the timer key 20 twice in succession. A bee-bop tone is sounded indicating deactivation of the timer.

ADJUSTMENT KEYS

RATE KEYS 22a and 22b: The rate keys 22a–b control the CPM of beats (or sequence of beats) sounded per minute. Each press of the up-arrow rate key 22a increases the CPM of beats one cycle per minute. Each press of the down-arrow rate key 22b decreases the CPM of beats one cycle per minute. Whenever a change in rate is made the new rate is displayed in the display window 12. Pressing either key 22a or 22b and holding it down rapidly changes the CPM accordingly. During the rate changing the tone is not sounded but begins to sound again immediately following the release of the key. A click is heard with each unit of change to confirm adjustment. The CPM of beats preferably ranges from 10 per minute to 170 per minute in whole number increments. The flat rate can be accessed at any time, even if the device is operating another function by pressing either one of the Rate keys. This would interrupt the current function and cause the device to begin beating at that constant rate until another selection is made.

VOLUME KEYS 24a and 24b: Pressing the up-arrow volume key 24a one time increases the volume being emitted by one increment. Pressing the down-arrow volume key 24b one time decreases the volume being emitted by one increment. Holding either volume key down rapidly increases or decreases the volume until it reaches a maximum or minimum level, or until the key is released. A click is heard with each unit of change to confirm adjustment. The lowest volume is barely audible. The highest volume is loud enough to be heard on the headsets over the noise of a busy office or classroom setting. The sound is emitted through the on-board speaker 40 unless a headset jack (not shown) is inserted, then the sound on the on-board speaker is silenced and the sound is only heard through a headset (not shown). The volume level need not be displayed on the display window 12.

PITCH KEYS 26a and 26b: The pitch keys 26a–b control the level of pitch of the tone emitted by the device 10. Pressing the up-arrow pitch key 26a one time heightens the pitch of the tone one increment. Pressing the down-arrow pitch key 26b one time lowers the pitch of the tone one increment. When the pitch is being adjusted a beep is heard to indicate adjustment. The pitch level need not be displayed on the display window 12.

FUNCTION KEYS

It is to be understood that the following functions involve production of audible beats designed to prompt the reader to read in synchronization with the tone a segment of text, such as one line of text per tone or one line of text per series of tones. Each function is directed to a specific sequence of such audible beats.

PUSH-UP KEY 28: Pressing the push-up key 28 produces a push-up icon 58 and activates a push-up exercise routine. Five selections are available; 10%, 20%, 30%, 40% and 50%. Each selection indicates the total percentage increase in the beat frequency collectively achieved over three push-up increases. The percentage of increase is based on the rate displayed at the time the push-up function is selected. For example: a 10% Push-up is selected by pressing the Push-up key one time. A 20% Push-up is selected by pressing the Push-up key two times in succession, and so on for each of the other three selections. If a 50% is displayed, pressing the Push-up key once more within the two second time interval would rotate the selection displayed over to 10% to begin the sequence again. The period of time between each successive key depression cannot exceed two seconds. Three push-up waves are activated for each selection.

The push-up icon 58 is displayed when the push-up key 28 is first depressed and the number indicating the push-up selected is displayed on the display screen 12 for three-seconds following the last depression of the key. The push-up key 28 is locked out until the function is complete or until a rate key 22a–b is pressed. When the selection desired is displayed three seconds the display toggles back to the rate, the tone is again sounded and the CPM of beats begins to increase. As the wave increments from one rate to the next, the new rate is displayed each time on the display screen 12. The rate will continue to increase until it reaches the percentage of increase that was selected, then the sound will pause and remain silent for three seconds before automatically beginning the second wave. Each of the second and third waves is identical to the first one. The time it takes to ramp up from the base rate to the selected increase rate is five minutes for each of the three waves when a 50% Push-up is selected, four minutes for a 40% selection, three minutes for a 30% selection and two minutes for both a 20% and a 10% selection. The five, four, three and two minute time frames occur regardless of the base rate that the push-up routine began with.

If the push-up selection would cause the CPM of beats to exceed 170 the device would increase as far as that limit then level off at 170 CPM. The time limit applicable to the percentage of increase selected would still be in effect. The push-up icon 58 remains displayed until the end of the third wave. At the end of the third wave an "I am finished" tone sounds, a silent pause of two seconds occurs and then the beat levels off at the rate it increased to and continues to sound at that level rate until another selection is made. To resume standard flat rate mode of operation at any time during this or any other function, press either rate key 22a or 22b and the device will begin beating at the current rate displayed.

RAMP KEY 30: Pressing the ramp key 30 once produces a ramp icon 56 in the display window 12 and activates a ramping exercise routine. Following a three second delay after the last moment the ramp key 30 was pressed, the ramping of the beats per minute begins at the current rate and increases the CPM one beat per minute every minute until interrupted. For example, during the ramp initiation, pressing the ramp key 30 twice in succession begins the ramping process at a two beat per minute increase every minute until interrupted. The number of times the key is pressed in succession determines the rate the CPM is increased every minute with a selection range, in whole number increments, from 1 to 10 beats per minute increase.

When pressing the ramp keys 30 to select a ramping rate, each press of the key must be followed by the next in not more than two second intervals. The number corresponding to the rate of ramp selected is displayed in the display window 12 each time the ramp key 30 is pressed. The last ramp rate selected remains displayed for three seconds following the last time the ramp key 30 was pressed, after which the display toggles back to the current rate that was displayed prior to the ramp selection. If r-10 is being displayed and the ramp key 30 is pressed once more within the two second time interval, the display would rotate over to r-1 to begin the sequence over again. As the ramping selection increments from one rate to the next, the new rate is displayed each time in the display window 12.

To interrupt the ramp function, one of the rate keys 22a or 22b must be pressed to exit the ramp mode and remove the ramp indicator icon 56 from the display. (The next time the ramp key 30 is pressed the device 10 would initiate the ramp function from the start.) At this point the rate of the beat levels off at the rate to which it increased and continues to beat and display this flat rate until another selection is made.

If uninterrupted, the CPM will continue to ramp until the maximum rate of 170 is achieved. The device 10 then displays and emits the tone at the rate of 170 beats per minute until another selection is made.

RAMPING PUSH-UP EXERCISE KEY 32: This function is selected by pressing the ramping push-up key 32, and is used to increase the CPM of beats from an initial rate to a desired percentage increase above the initial rate, over a series of intermediate increases. Five selections are available: 20%, 40%, 60%, 80% and 100%. These selections are referred to as the desired percentage increase selected throughout the remainder of this section. Each selection indicates the total percentage increase in the beat frequency collectively achieved over three intermediate increases, each intermediate increase occurring over a specified time period.

The percentage of increase is based on the rate displayed at the time ramping push-up is selected. For example: a 20% Ramping Push-up is selected by pressing the Ramping Push-up key one time. A 40% Ramping Push-up is selected by pressing the Ramping Push-up key two times in succession, and so on for each of the other three selections. The period of time between each successive key depression cannot exceed two seconds.

A ramping push-up icon 54 is produced when the ramping push-up key 32 is first depressed, and the number indicating the ramping push-up selected is displayed in the display window 12 and will remain displayed for three seconds following the last depression of the key. If a 100% is displayed, pressing the ramping push-up 32, key once more within the two second time interval would rotate the selection over to 20% beginning the sequence over again. When the selection desired is displayed three seconds, the display toggles back to the rate, the tone is again sounded and the CPM of beats each minute begins to increase. The ramping push-up key 32 is rendered ineffectual until the function is complete or until a rate key 22a or 22b is pressed. As each ramping wave increments from one rate to the next, the new rate is displayed each time in the display window 12.

Figure 3:
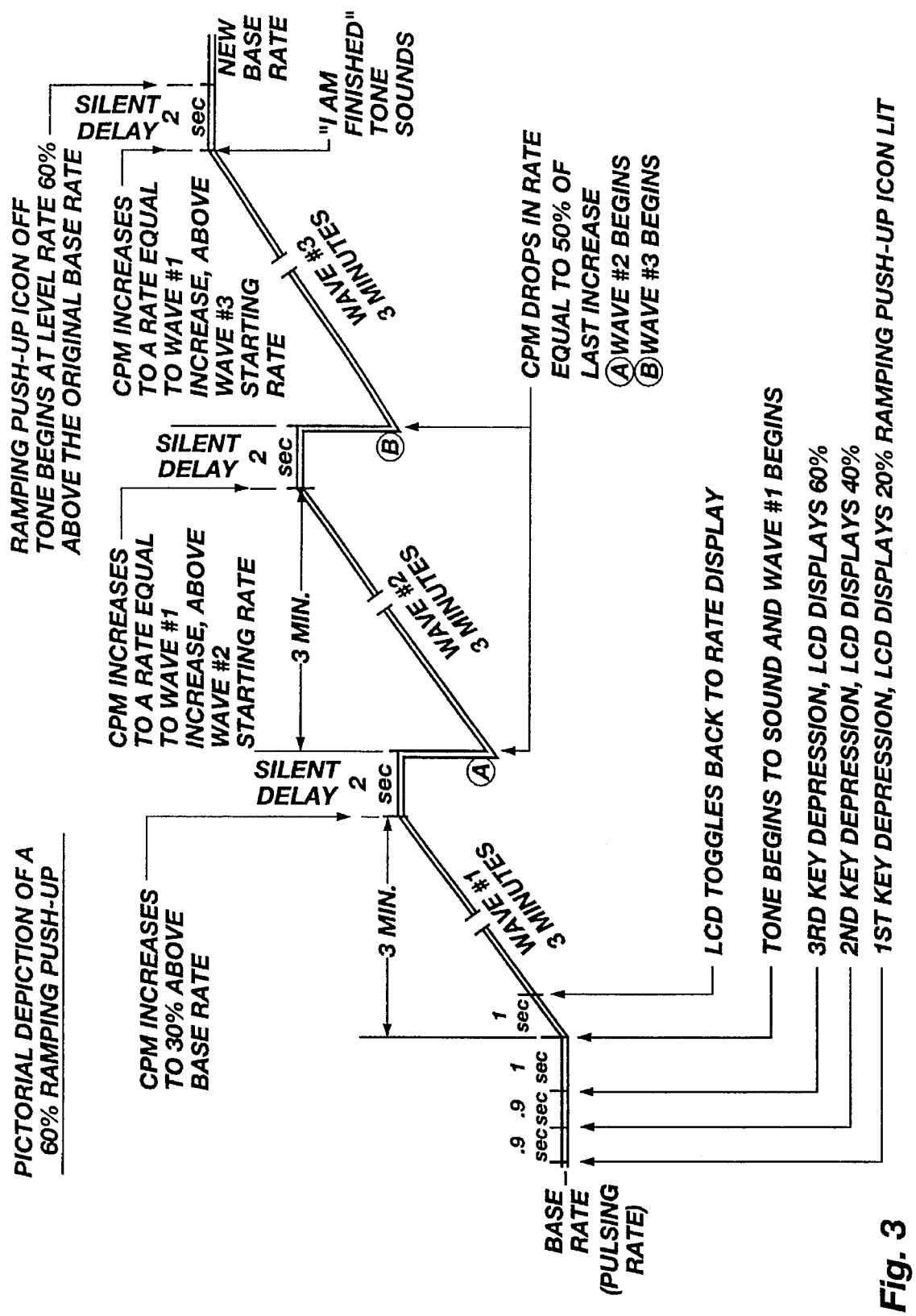
FIG. 3 illustrates a pictorial depiction of a ramping push-up exercise in accordance with the principles of the present invention.

A preferred ramping push-up function involves three waves and operates as follows and as shown in FIG. 3. During the first wave, the pulsing rate of audible beats will continue to increase until it reaches a first intermediate pulsing rate equal to approximately one-half of the desired percentage increase above the initial pulsing rate. Then the sound will pause and remain silent for two seconds before automatically beginning the second ramping wave. Pressing the on-off-pause key 14 during this or any pause interval would immediately initiate the next segment of the current function. The pulsing rate is abruptly dropped to a first decreased pulsing rate equal to approximately one-fourth of the desired percentage increase above the initial pulsing rate.

The second ramping wave increases from that point until it reaches a rate one-half of the desired percentage increase selected above the rate at which the second ramping wave began, or in other words a rate equal to approximately three-fourths of the desired percentage increase above the initial pulsing rate. Then the sound will pause and remain silent for two seconds before automatically beginning the third ramping wave. The pulsing rate then drops abruptly to a second decreased pulsing rate equal to approximately one-half of the desired percentage increase above the initial pulsing rate.

The third ramping wave increases at the same rate of increase as the first and second ramping waves, until it reaches approximately the full desired percentage increase selected above the initial rate. (This rate would be one-half of the percentage of increase selected above the rate at which the third ramping wave began.) The ramping push-up icon 54 remains displayed until the end of the third ramping wave, then turns off. At the end of the third ramping wave an "I am finished" tone sounds and the beat levels off at the rate it increased to and after a two second silent pause continues to sound until another selection is made. Pressing either of the rate keys 22a and 22b will exit the ramping push-up function and begin the flat rate mode at the current rate.

The time it takes to ramp up from the base rate to the selected increase rate is five minutes for each of the three ramping waves when a 100% push-up is selected, four minutes for a 80% selection, three minutes for a 60% selection and two minutes for both a 40% and a 20% selection. The five, four, three and two minute time frames remain consistent regardless of the base rate at which the ramping push-up began. If the ramping push-up selected would cause the CPM of beats to exceed the 170, the device 10 would increase as far as that limit then level off at 170 CPM. In this event the time limit applicable to the percentage of increase selected would still be in effect.

It is to be understood that the ramping push-up function, and any other function, can be used with activities besides reading, such as musical and speech exercises. It is also to be understood that various modifications of the ramping push-up function can be designed in accordance with the spirit and scope of the function intended. For example, the ramping waves could be designed to embrace different percentage increases, and the percent drop in the pulsing rate between each wave could be altered. Accordingly, the ramping push-up function in a preferred, basic form is defined as follows:

(a) activating pulsed audible guide tones at an initial pulsing rate; and (b) repeatably (i) increasing the pulsing rate over a time span to a successively higher pulsing rate and (ii) abruptly dropping the pulsing rate to a lower rate between the higher pulsing rate and the initial pulsing rate, until a predetermined final pacing rate is reached.

Step (b) may be further defined to include performing substeps (i) and (ii) such that each successively higher pulsing rate pulses at a faster rate than previous pulsing rates.

COMPREHENSION CHECK KEY 34: Pressing the comprehension check (CC) key 34 once produces a CC icon 54 and initiates the CC function. The display window 12 immediately displays 3:00, indicating that the length of each repetition will be three minutes. Pressing the CC key 34 twice in succession displays 5:00 on the display window 12 indicating the length of each repetition will be five minutes. Pressing the CC key 34 three times in succession displays 10:00 on the display window 12 indicating the length of each repetition will be ten minutes. The period of time between each successive key depression cannot exceed two seconds. As many times as the key is pressed the display will rotate from 3:00 to 5:00 to 10:00 and back to 3:00 again to begin the sequence over providing the key depressions are made within the two second time limit interval. After a three second silent pause following the last depression of the CC key 34, the tone begins to sound at a rate that is 50% above the rate that was pulsing before the CC function was selected.

Figure 5:
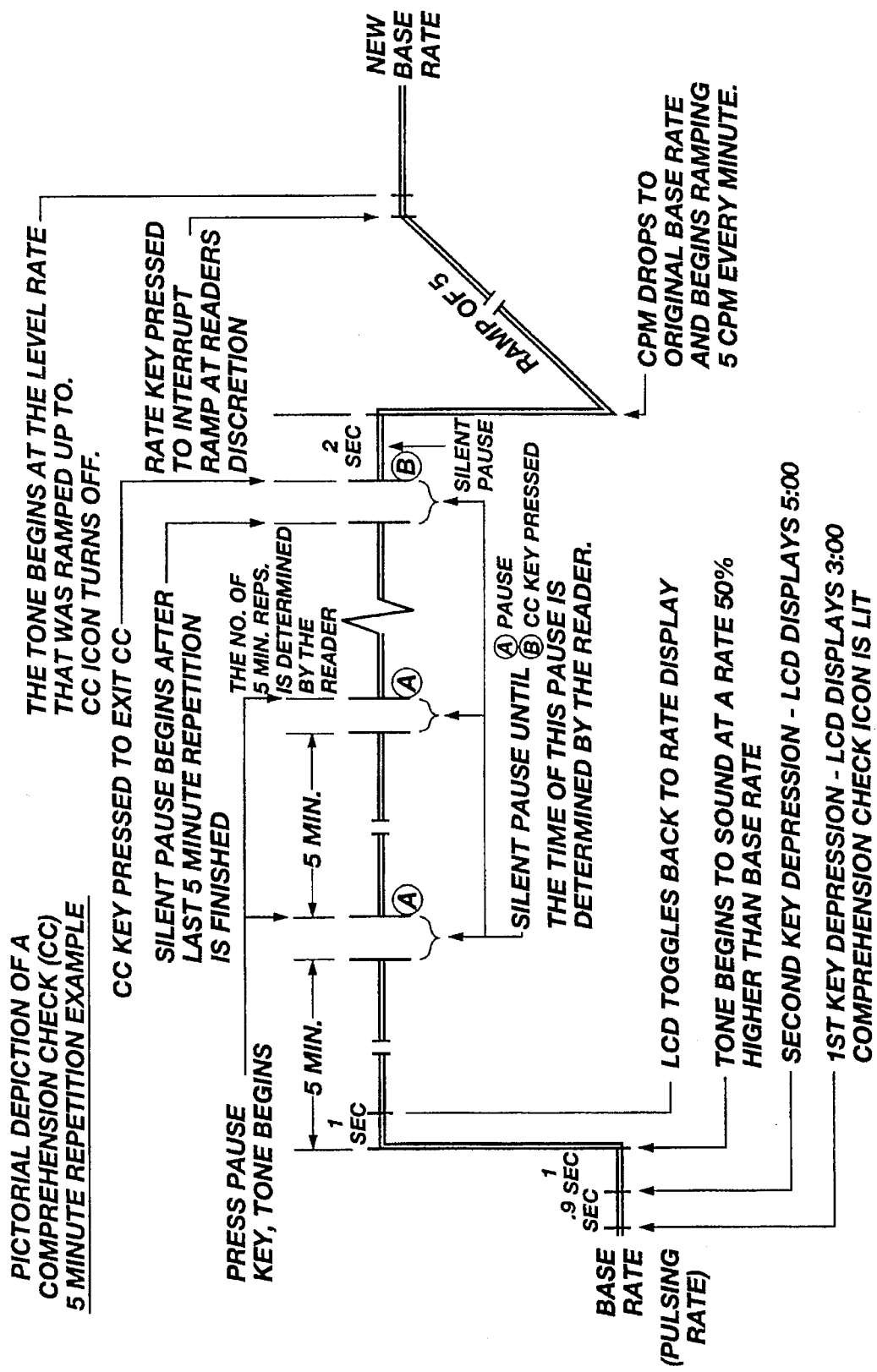
FIG. 5 illustrates a pictorial depiction of a comprehension check exercise in accordance with the principles of the present invention.

In the event that the 50% increase would take the pulsing rate above the upper limit of 170, the device 10 defaults to the rate of 170. The selection remains displayed for three seconds following the last depression of the CC key 34, then toggles back to the rate display. The display window 12 displays the current pulsing rate. The tone will continue to sound until either three, five or ten minutes has expired depending on what was selected. At this point the device 10 enters pause mode with the pause icon 50 flashing and waits for the instruction to begin the second repetition. During this pause a comprehension exercise may be conducted to improve recall comprehension skills. That instruction is made by pressing the on-off-pause key 14, thus toggling the device 10 to the on mode and beginning the second repetition. The device will repeat the first repetition, in the time interval previously selected, as many times as the on-off-pause key 14 is used to restart the next repetition. An example of the comprehension check function operating at the five-minute selection is shown pictorially in FIG. 5.

To interrupt the repetitions at any point, except in pause mode, the CC key 34 must again be pressed. At this point the tone begins to sound again and the display window 12 displays the original rate that was beating before the comprehension check was selected. After a three second silent pause, the device 10 automatically begins a ramp of five beats per minute increase, every minute, until interrupted by exit of the comprehension check function. The CC icon 34 is unlit and the ramp icon 56 is lit. As the ramp increments from one rate to the next, the new rate is displayed each time in the display window 12. In the event that the ramp would take the rate above the upper limit of 170, the device 10 simply levels out at 170 and continues to beat until interrupted. To exit the CC function, one of the rate keys 22a or 22b must be pressed. At this point, the ramp icon 56 is unlit, the current rate is displayed in the display window 12 and the tone begins to sound at that flat rate, until another selection is made. The comprehension check function is preferably performed by re-reading the same text segments during each time interval. Applicant has found this practice to build confidence in the reader because comprehension improves each time the text is re-read, even though it is read at a very rapid rate. Then the reader is permitted to read new text at the ramping rate until a rate is reached which is slow enough to allow first-time comprehension, but fast enough to engage the reader's concentration to inhibit the mind from wandering.

Note: Whenever a function is selected, the beat and timer keys 16 and 20 are preferably rendered ineffectual until the function is exited either automatically or by depression of a rate key 22a–b. It is preferable to design and program the device 10 such that a user may adjust voice, volume and pitch within any function.

The comprehension check function in a preferred, basic form is defined as follows:

(a) activating pulsed audible guide tones over at least one time span at an exercise pulsing rate and simultaneously reading a segment of text per each pulsed audible guide tone at a corresponding exercise reading rate, wherein said exercise pulsing rate is higher than a first pulsing rate corresponding to the first reading rate;

(b) dropping the pulsing and reading rates to the first pulsing and reading rates and producing a pulsing increase in the pulsing rate to thereby increase said pulsing and reading rates over a time span;

(c) selectively interrupting the pulsing increase when the pulsing rate attains a desired second pulsing rate to thereby maintain the pulsing and reading rates at the desired second pulsing rate and corresponding second reading rate.

It will be appreciated that the ramping push-up function and the comprehension check function are not mere reformulations of the old methods. Rather, they are novel approaches to inducing increased effort on the part of the reader without overextending the reader's limitations. For example, unlike the conventional push-up and ramp exercises, the ramping push-up exercise does not force the reader to cover the entire rate increase desired in a single wave. Rather, the increase is achieved in a series of progressive-regressive waves, as seen pictorially in FIG. 3. The stress of continuous speed increase is moderated by permitting some regression of the pulsing rate between each wave, but not complete regression back to the initial rate. This allows the reader to relax somewhat between waves and adjust to the stress of the effort while retaining some of the rate progress. Applicant has found that the ramping push-up induces constructive progress in the reader because it firmly prods the reader toward the goal without overwhelming the reader with a single-wave increase from the initial rate to the desired rate. FIGS. 4A and 4B illustrate matrices of pulsing rates produced in the ramping push-up function, for initial base rates of twenty cycles per minute and forty cycles per minute, respectively.

The comprehension check exercise also permits constructive regression of the pulsing rate, in that the exercise rate drops back to the initial rate as a part of the exercise, followed by a ramping wave. The stress of performance at the high-level exercise rate (see FIG. 5) is prevented from overwhelming the exerciser by the final ramping wave which begins at the initial rate. Although the comprehension check exercise permits regression back to the initial pulsing rate, applicant has found that it also induces constructive effort, especially when the initial exercise rates are set above the desired final rate. Applicant has found the ramping push-up and comprehension check exercises to be highly effective when used as speed reading exercises.

Figure 2:
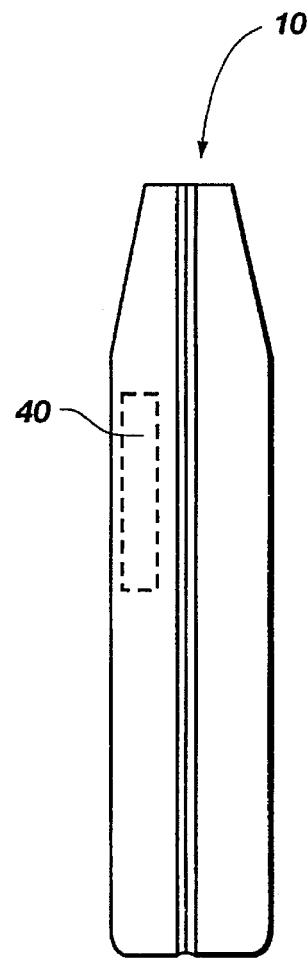
FIG. 2 illustrates a side view of the device of FIG. 1.
Figure 6:
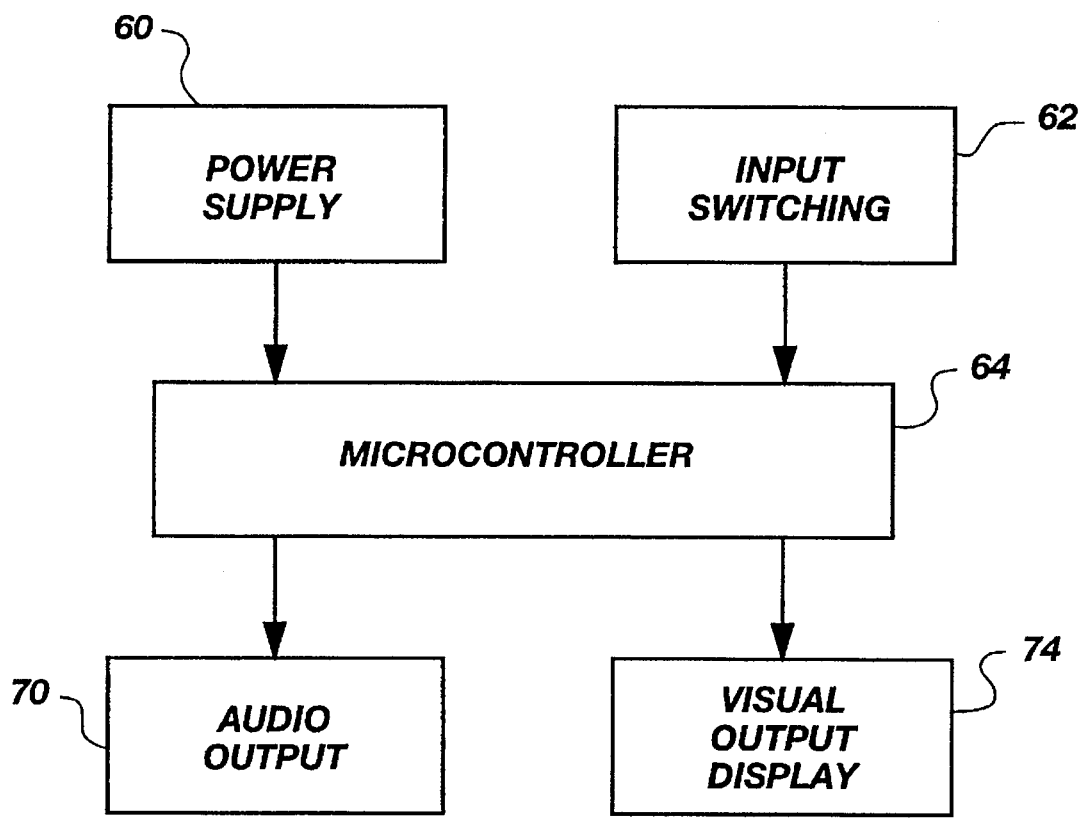
FIG. 6 illustrates a schematic block diagram of the control circuitry and other elements used in operating the device of FIG. 1.

Referring now to FIG. 6, there is shown a schematic block diagram of the control circuitry used in operating the device 10 of FIGS. 1–2. The components represented in FIG. 6 are readily understandable to those of ordinary skill in the art of conventional circuitry control operations. The power source mentioned above is illustrated as block 60. Input switching is shown as block 62, in reference to the previously discussed switch keys. The power source 60 and input switching 62 are operatively connected to microcontroller 64, which is operatively connected electronically to audio output 70 and visual output display 74, as suggested above. The visual output display 74 corresponds to the display window 12 of FIG. 1, and the audio output 70 corresponds to the speaker 40 of FIG. 2 or optionally to the headset mentioned above. The block layout design of FIG. 6 illustrates the conventional nature of the hardware necessary to render the device 10 of FIG. 1 operative. Those having ordinary skill in the art can program the microcontroller 64 in various conventional ways to creative the pulse-tone sequences described above. The operation sequence of the components illustrated schematically in FIG. 6 necessary to achieve the performance characteristics described herein is readily ascertainable by those of ordinary skill.

The present invention represents a significant advance in the field of pacing devices. It is to be understood that although the present invention has been illustrated herein in the context of speed reading enhancement, it is equally applicable to any timed exercise. The disadvantages in the prior art noted above and others not discussed are overcome to a significant degree by the present invention. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A pulsed-tone pacing method comprising the steps of:
   (a) activating pulsed audible guide tones at an initial pulsing rate; and
   (b) repeatably (i) increasing the pulsing rate over a time span to a successively higher pulsing rate and (ii) abruptly dropping the pulsing rate to a lower rate between the higher pulsing rate and the initial pulsing rate, until a final pacing rate is reached.

2. A pulsed-tone timing method as defined in claim 1 wherein step (b) further comprises performing substeps (i) and (ii) such that each successively higher pulsing rate pulses at a faster rate than previous pulsing rates.

3. A pulsed-tone timing method as defined in claim 1 wherein step (a) further comprises activating at least one weaker tone following each guide tone.

4. A pulsed-tone timing method as defined in claim 1 wherein step (a) further comprises activating each guide tone in the form of a continuous tone of longer duration and further activating at least one pulsed tone of a shorter duration following each guide tone.

5. A pulsed-tone timing method as defined in claim 4 wherein step (a) further comprises activating the at least one pulsed tone in the form of a series of pulsed tones collectively having a shorter duration than a preceding guide tone.

6. A pulsed-tone timing method as defined in claim 1, wherein step (b) further comprises the steps of:
   (c) selecting a desired pulsing rate percentage increase;
   (d) uniformly increasing the pulsing rate over a first time span to a first higher pulsing rate equal to approximately one-half of the desired percentage increase above the initial pulsing rate;
   (e) abruptly dropping the pulsing rate to a first lower pulsing rate equal to approximately one-fourth of the desired percentage increase above the initial pulsing rate;
   (f) uniformly increasing the pulsing rate over a second time span to a second higher pulsing rate equal to approximately three-fourths of the desired percentage increase above the initial pulsing rate;
   (g) abruptly dropping the pulsing rate to a second lower pulsing rate equal to approximately one-half of the desired percentage increase above the initial pulsing rate;
   (h) uniformly increasing the pulsing rate over a third time span to a final pacing rate equal to approximately the full desired percentage increase above the initial pulsing rate.

7. A pulsed-tone timing method as defined in claim 6, further comprising the steps of:
   (i) interrupting the pulsing rate following step (d) with a period of silent delay prior to commencing with step (e);
   (j) interrupting the pulsing rate following step (f) with a period of silent delay prior to commencing with step (g);
   (k) interrupting the pulsing rate following step (h) with a period of silent delay and then re-activating the pulsed audible guide tones at the final pulsing rate.

8. A reading exercise method for increasing a reading rate of a reader, said method comprising the steps of:

(a) activating pulsed audible guide tones at an initial pulsing rate and simultaneously reading a segment of text per each pulsed audible guide tone at a corresponding initial reading rate;

(b) repeatably (i) increasing the pulsing rate, and thus the reading rate, over a time span to a successively higher pulsing and reading rate and (ii) abruptly dropping the pulsing rate, and thus the reading rate, to a lower pulsing and reading rate between the higher pulsing and reading rate and the initial pulsing and reading rate, until a final pulsing rate and corresponding final reading rate are reached.

9. A reading exercise method as defined in claim 8, wherein step (b) further comprises performing substeps (i) and (ii) such that each successively higher pulsing rate pulses at a faster rate than previous pulsing rates.

10. A reading exercise method as defined in claim 8 wherein step (a) further comprises activating at least one weaker tone following each guide tone.

11. A reading exercise method as defined in claim 8 wherein step (a) further comprises activating each guide tone in the form of a continuous tone and simultaneously reading a line of text from left to right per each guide tone, and activating at least one pulsed tone following each guide tone while moving one's line of sight from right to left to a following line of text.

12. A reading exercise method as defined in claim 11 wherein step (a) further comprises activating the at least one pulsed tone in the form of a series of pulsed tones collectively having a shorter duration than a preceding guide tone.

13. A reading exercise method as defined in claim 8, wherein step (b) further comprises the steps of:

(c) selecting a desired pulsing and reading rate percentage increase;

(d) uniformly increasing the pulsing and reading rate over a first time span to a first higher pulsing and reading rate equal to approximately one-half of the desired percentage increase above the initial pulsing and reading rate;

(e) abruptly dropping the pulsing and reading rate to a first lower pulsing and reading rate equal to approximately one-fourth of the desired percentage increase above the initial pulsing and reading rate;

(f) uniformly increasing the pulsing and reading rate over a second time span to a second higher pulsing and reading rate equal to approximately three-fourths of the desired percentage increase above the initial pulsing and reading rate;

(g) abruptly dropping the pulsing and reading rate to a second lower pulsing and reading rate equal to approximately one-half of the desired percentage increase above the initial pulsing and reading rate;

(h) uniformly increasing the pulsing and reading rate over a third time span to a final pulsing and reading rate equal to approximately the full desired percentage increase above the initial pulsing and reading rate.

14. A reading exercise method as defined in claim 13, further comprising the steps of:

(i) interrupting the pulsing and reading rate following step (d) with a period of silent delay prior to commencing with step (e);

(j) interrupting the pulsing and reading rate following step (f) with a period of silent delay prior to commencing with step (g);

(k) interrupting the pulsing and reading rate following step (h) with a period of silent delay and then re-activating the pulsed audible guide tones at the final pulsing and reading rate.

15. A reading exercise method for increasing a reading rate of a reader from a first reading rate to a second reading rate, said method comprising the steps of:

(a) activating pulsed audible guide tones over at least one time span at an exercise pulsing rate and simultaneously reading a segment of text per each pulsed audible guide tone at a corresponding exercise reading rate, wherein said exercise pulsing rate is higher than a first pulsing rate corresponding to the first reading rate;

(b) dropping the pulsing and reading rates to the first pulsing and reading rates and producing a pulsing increase in the pulsing rate to thereby increase said pulsing and reading rates over a time span;

(c) selectively discontinuing the pulsing increase when the pulsing rate attains a desired second pulsing rate and maintaining a flat reading rate at the desired second pulsing rate and corresponding second reading rate.

16. A reading exercise method as defined in claim 15 wherein step (a) further comprises activating the pulsed audible guide tones at an exercise pulsing rate which represents a 50% increase above the first pulsing rate.

17. A reading exercise method as defined in claim 16 wherein step (c) further comprises interrupting the pulsing increase when the pulsing rate attains a desired second pulsing rate which is less than the exercise pulsing and reading rate.

18. A reading exercise method as defined in claim 15 wherein step (a) further comprises activating the pulsed audible guide tones over a plurality of time spans and re-reading the same segments of text during each time span.

* * * * *